T. SOPWITH.
BRAKE FOR AEROPLANES.
APPLICATION FILED MAY 12, 1917.

1,293,228.

Patented Feb. 4, 1919.
2 SHEETS—SHEET 1.

INVENTOR
Thomas Sopwith
Per Robert F. Phillips
Attorney

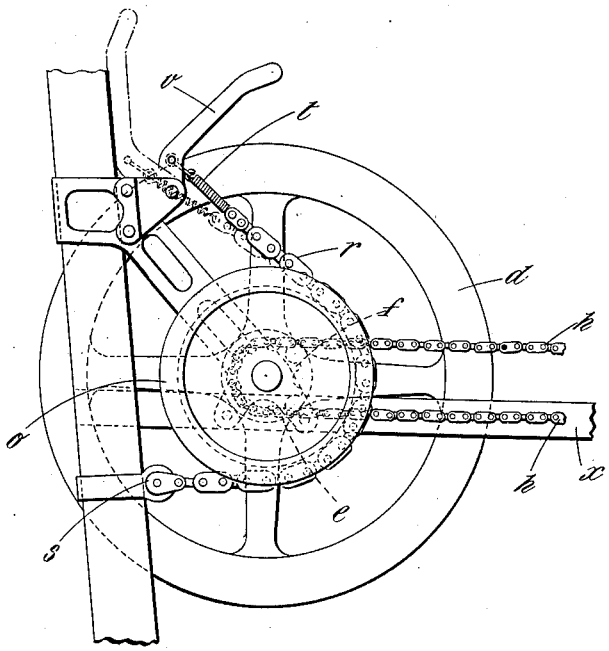
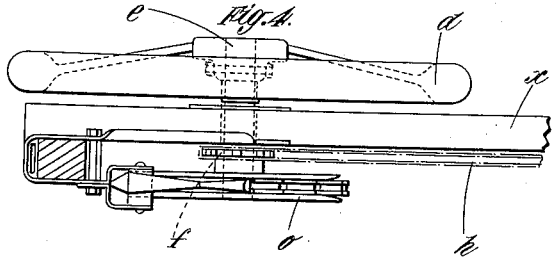
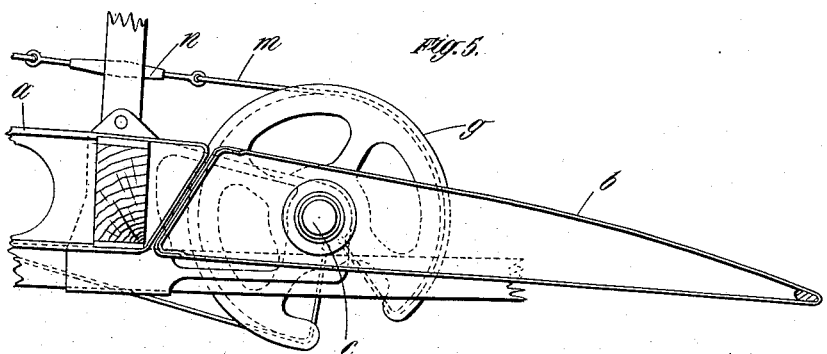

UNITED STATES PATENT OFFICE.

THOMAS SOPWITH, OF KINGSTON-UPON-THAMES, ENGLAND.

BRAKE FOR AEROPLANES.

1,293,228. Specification of Letters Patent. Patented Feb. 4, 1919.

Application filed May 12, 1917. Serial No. 168,293.

*To all whom it may concern:*

Be it known that I, THOMAS SOPWITH, a subject of the King of Great Britain and Ireland, residing at Kingston-upon-Thames, in the county of Surrey, England, have invented certain new and useful Improvements in Brakes for Aeroplanes, of which the following is a specification.

This invention relates to an improved wind or air brake for arresting the speed of aeroplanes, which has for its object overcoming many of the objections found in existing constructions, and it consists of two planes forming parts of the main planes or aerofoils each located in close proximity to the body or fuselage of the machine on opposite sides thereof and mounted on a common shaft running transversely through the body or fuselage, and of means for locking said braking planes in their operative and non-operative positions.

In the accompanying drawing which shows—by way of example—this invention applied to an aeroplane of the biplane type:—

Figs. 3 and 4 are broken views in side elevation and plan respectively—on an enlarged scale—showing the operating and locking mechanism of the brake, and Fig. 5 is a broken view in side elevation—on an enlarged scale—showing the method of pivoting one of the braking planes.

Throughout the views similar parts are marked with like letters of reference.

Figure 1:
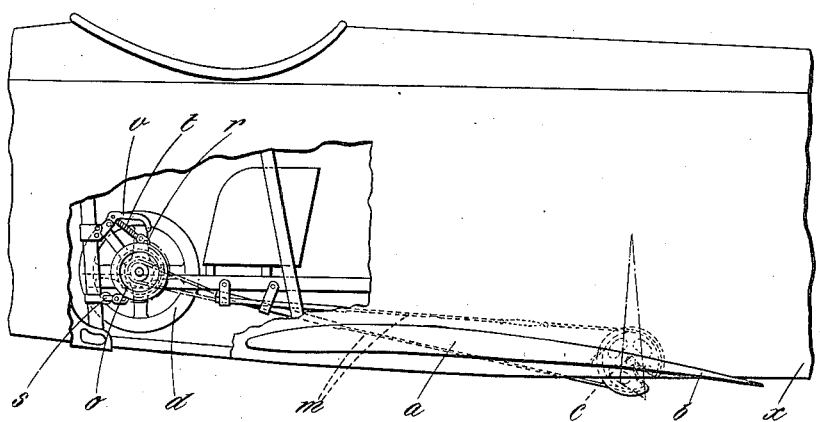
Figure 1 is a broken view in side elevation.

On each side of the body or fuselage $x$ of the machine in the rear edges of the inner parts $a$ of the main planes are recesses in which are pivoted the braking planes $b$. These braking planes are mounted on a shaft $c$ which extends transversely through the body or fuselage so that both braking planes partake of the same movement. By rotating the shaft $c$ said planes can be caused to assume either their normal or "out of action" positions as shown in full lines in Figs. 1, 2 and 5 or their operative or braking positions as shown in dot and dash lines in Fig. 1.

The braking planes $b$ are so shaped that in their normal positions, *i. e.* when they are in their inoperative positions as brakes, they complete the shape and formation of the aerofoils. The back edge of each of the braking planes and the adjacent edge of the recesses in each of the aerofoils are preferably beveled so that in engagement they act as a stop to limit the movement of the braking planes when they assume their normal positions and assume the correct continuity of the shape of the aerofoil.

To vary the positions of the braking planes $b$ a hand wheel $d$ mounted on a spindle $e$ carried in a suitable bearing mounted on the fuselage $x$ is arranged in a position convenient to the pilot's seat. The spindle $e$ is connected to the shaft $c$ so that said shaft can be rotated by means of the hand wheel $d$ by any suitable gearing. A convenient gearing is that shown in the accompanying drawings which comprises a sprocket wheel $f$ mounted on the spindle $e$, a pulley $g$ fixed on the shaft $c$, a length of chain $h$ engaging the sprocket wheel $f$, and wire cables $m$ connecting the ends of the chain $h$ to two opposed points on the periphery of the pulley $g$. A strainer or turn-buckle $n$ is interposed in one of the cables $m$ to enable any slack that may arise in the connection to be taken up.

On the spindle $e$ is also mounted a brake drum $o$ which is preferably grooved as shown. With this engages a flexible band $r$ one end of which is anchored to any convenient fixed point $s$ on the fuselage and the other end of which is coupled to a lever $v$ pivoted on any fixed point in suitable relationship to the drum $o$. Any suitable means may be provided for locking the lever $v$ in the position it assumes when the brake band $r$ is tightened on the drum $o$, a convenient one being that illustrated in the accompanying drawing which consists in inserting an elastic link in the band $r$ which can conveniently take the form of a spring $t$ and in so locating the point of attachment of the band $r$ to the lever $v$ in relation to the point of pivot of said lever that when said lever approaches the position it assumes when the band is tightened on the drum $o$ the line of tension or pull on the band $r$ is transferred to a line on the opposite side of the fulcrum of the lever $v$ so that the tension of the elastic connection in said band operates to keep or retain the lever in its "pull-on" position.

Figure 2:
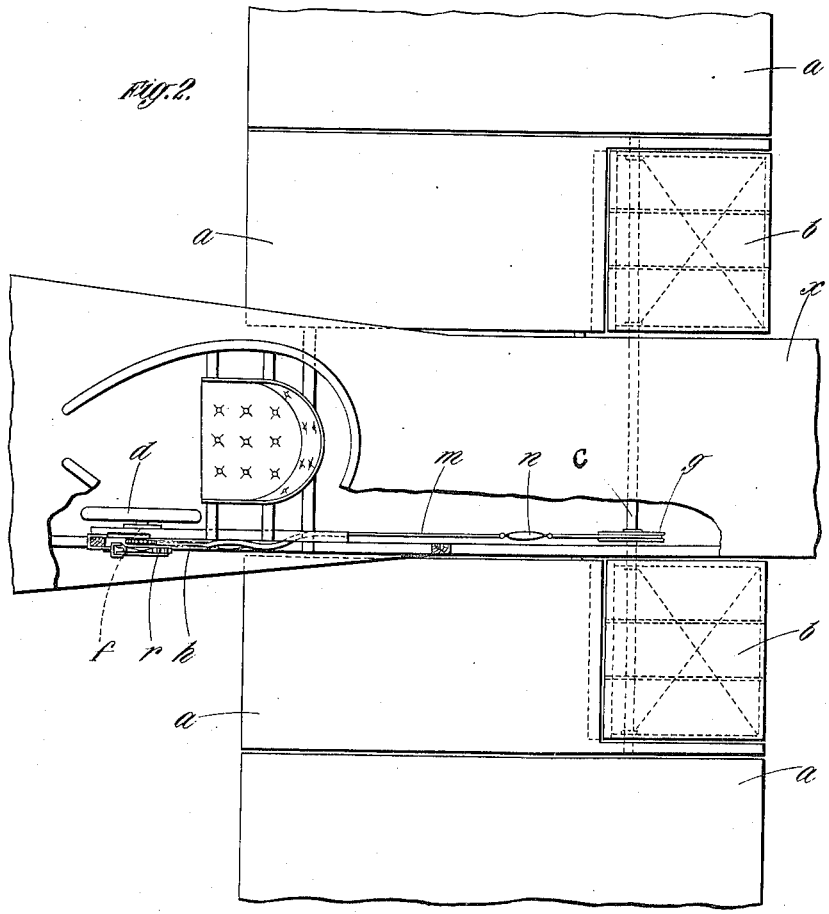
Fig. 2 is a broken view in plan.

To operate the brake the pilot turns the hand wheel $d$ until the braking planes $b$ $b$ are raised into their operative positions as shown in dot-and-dash lines in Fig. 1. The planes $b$ $b$ are then locked in this position by pressing the lever $v$ forward until it becomes self-locked as before described. To take off the brake the lever $v$ is pulled back and the hand wheel rotated until the planes $b\ b$ assume their normal inoperative positions, and stops other than the beveled engaging edges of the planes $b$ and the recesses in the aerofoils $a$ may be employed to limit the movement of the braking planes when same have reached their non-operative positions.

What I claim as my invention, and desire to secure by Letters Patent is:—

1. A brake for aeroplanes comprising two planes forming parts of the main planes carried directly by the fuselage of the machine, said braking planes being located at the rear of the main planes and in close proximity to the sides of the body or fuselage, a common transversely arranged shaft carrying said planes, means adjacent to the pilot's seat for rotating said shaft to bring the braking planes into and out of their braking positions and means for holding and locking said operating mechanism.

2. A brake for aeroplanes comprising braking planes mounted on a shaft arranged transversely in respect to the fuselage or frame of the machine and mounted in suitable bearings carried thereby, a pulley mounted on said shaft, a hand wheel mounted on a spindle running in a bearing carried by the fuselage of the machine in juxtaposition to the pilot's seat, a driving connection between said spindle and the pulley on the shaft carrying the braking planes.

3. A brake for aeroplanes comprising braking planes mounted in close proximity to the sides of the fuselage of the machine on a shaft transversely arranged in respect to the fuselage of the machine and mounted in suitable bearings carried by said fuselage, a pulley mounted on said shaft, a spindle mounted in a bearing carried by the fuselage of the machine, a driving connection between said spindle and the pulley on the shaft carrying the braking planes, a hand wheel on said spindle for imparting motion to the shaft carrying the braking planes, and a device for locking said spindle in a position to hold the braking planes in their operative positions.

4. In a brake for aeroplanes the combination of a transversely arranged shaft $c$ mounted in suitable bearings in the fuselage $x$, braking planes $b\ b$ mounted on said shaft on each side of the fuselage, a pulley $g$ mounted on the shaft $c$, a spindle $e$ mounted in a bearing carried by the fuselage $x$, a hand wheel $d$ mounted on said spindle, a sprocket wheel $f$ mounted on said spindle, a brake drum $o$ mounted on said spindle, a chain $h$ engaging the sprocket wheel $f$, flexible cables $m$ connecting the two ends of the chain $h$ with the pulley $g$ at two opposed points on its periphery, an operating lever $v$ pivoted to a fixed point, a brake band $r$ engaging the brake drum $o$ one end of which is anchored to a fixed point and the other end of which is coupled to the lever $v$, and means for locking said band in operative contact with the brake drum $o$.

5. In an aeroplane the combination of two two-part main planes the inner parts of which are fixed to the fuselage and the outer parts of which are detachably mounted on the fixed parts, a transversely arranged shaft $c$ mounted in suitable bearings in the fuselage $x$, in the inner parts of the main frame, braking planes $b\ b$ mounted on said shaft on each side of the fuselage, a pulley $g$ mounted on the shaft $c$, a spindle $e$ mounted in a bearing carried by the fuselage $x$, a hand wheel $d$ mounted on said spindle, a sprocket wheel $f$ mounted on said spindle, a brake drum $o$ mounted on said spindle, a chain $h$ engaging the sprocket wheel $f$, flexible cables $m$ connecting the two ends of the chain $h$ with the pulley $g$ at two opposed points on its periphery, a turn-buckle or strainer $n$ in one of the cables $m$, an operating lever $v$ pivoted to a fixed point, a brake band $r$ engaging the brake drum $c$ one end of which is anchored to a fixed point, a spring $t$ connecting the other end of the brake band $r$ with the lever $v$, and means for locking said band in operative contact with the brake drum $o$.

6. In an aeroplane the combination with two-part main planes or aerofoils of braking planes $b\ b$ combined with the inner parts of said main planes or aerofoils, a common shaft $c$ by which the planes $b$ are pivoted to the main planes or aerofoils and to the fuselage, a pulley $g$ mounted on the shaft $c$, a spindle $e$ mounted in a bearing carried by the fuselage $x$, a hand wheel $d$ mounted on said spindle, a sprocket wheel $f$ mounted on said spindle, a brake drum $o$ mounted on said spindle, a chain $h$ engaging the sprocket wheel $f$, flexible cables $m$ connecting the two ends of the chain $h$ with the pulley $g$ at two opposed points on its periphery, a turn-buckle or strainer $n$ in one of the cables $m$, an operating lever $v$ pivoted to a convenient point in juxtaposition to the pilot's seat, a brake band $r$ engaging the brake drum $o$ one end of which is anchored to a fixed point and the other end of which is coupled to the lever $v$, and means for locking said band in operative contact with the brake drum $o$.

In testimony whereof I have signed my name.

THOMAS SOPWITH.

Witnesses:
H. P. MUSGRAVE,
N. GOODENAUGH.